(12) United States Patent
Hattori

(10) Patent No.: US 7,483,064 B2
(45) Date of Patent: Jan. 27, 2009

(54) IMAGING APPARATUS

(75) Inventor: Yuko Hattori, Yokohama (JP)

(73) Assignee: Nikon Corporation, Tokyo (KP)

( * ) Notice: Subject to any disclaimer, the term of this patent is extended or adjusted under 35 U.S.C. 154(b) by 495 days.

(21) Appl. No.: 11/376,108

(22) Filed: Mar. 16, 2006

(65) Prior Publication Data

US 2006/0221216 A1  Oct. 5, 2006

(30) Foreign Application Priority Data

Mar. 31, 2005  (JP)  ............... 2005-101063

(51) Int. Cl.
    *H04N 5/202* (2006.01)
(52) U.S. Cl. .................................... 348/254
(58) Field of Classification Search ............... 348/254, 348/255, 671, 674; 382/274; 358/519
    See application file for complete search history.

(56) References Cited

U.S. PATENT DOCUMENTS

| 5,691,821 | A | | 11/1997 | Hieda et al. | |
|---|---|---|---|---|---|
| 6,040,860 | A | * | 3/2000 | Tamura et al. | ............... 348/255 |
| 6,141,047 | A | * | 10/2000 | Kawai et al. | ............... 348/254 |
| 2003/0146989 | A1 | * | 8/2003 | Hattori et al. | ............... 348/254 |
| 2004/0179111 | A1 | * | 9/2004 | Hattori | ............... 348/222.1 |
| 2004/0207736 | A1 | | 10/2004 | Muramatsu | |
| 2005/0195291 | A1 | * | 9/2005 | Kubo | ............... 348/229.1 |
| 2006/0055991 | A1 | * | 3/2006 | Minakuti et al. | ............... 358/521 |
| 2006/0164524 | A1 | * | 7/2006 | Shibano et al. | ............... 348/234 |

FOREIGN PATENT DOCUMENTS

| JP | A 2003-241248 | 8/2003 |
|---|---|---|
| JP | B2 3486425 | 1/2004 |
| JP | A 2004-229054 | 8/2004 |

\* cited by examiner

*Primary Examiner*—Lin Ye
*Assistant Examiner*—Jason Whipkey
(74) *Attorney, Agent, or Firm*—Oliff & Berridge, PLC

(57) ABSTRACT

An imaging apparatus can provide final image data with a good quality irrespective of overexposure or underexposure. The imaging apparatus includes an imaging unit capturing a subject image to produce image data, a conversion unit performing a gradation conversion on the image data, a modification unit determining the level of brightness of the image data before the gradation conversion, and modifying input/output characteristics for the gradation conversion on the image data when a brightness level of the image data is lower than a reference level of brightness. The input/output characteristics include a gamma characteristic portion and a knee characteristic portion. The modification unit modifies the input/output characteristics such that output level is increased within a range of part of input level corresponding at least to the gamma characteristic portion, in comparison with the input/output characteristics of the image data with the reference level of brightness.

12 Claims, 4 Drawing Sheets

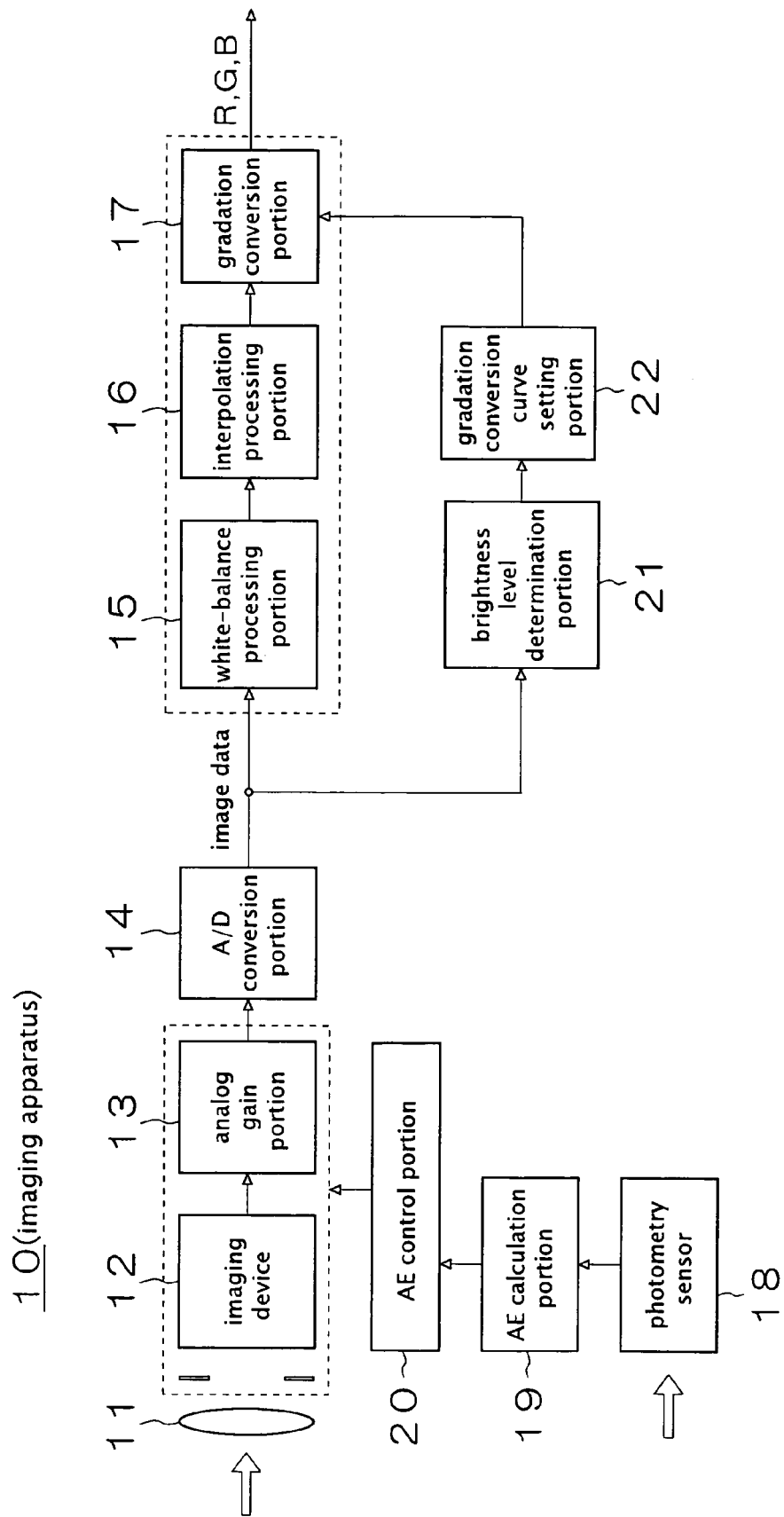

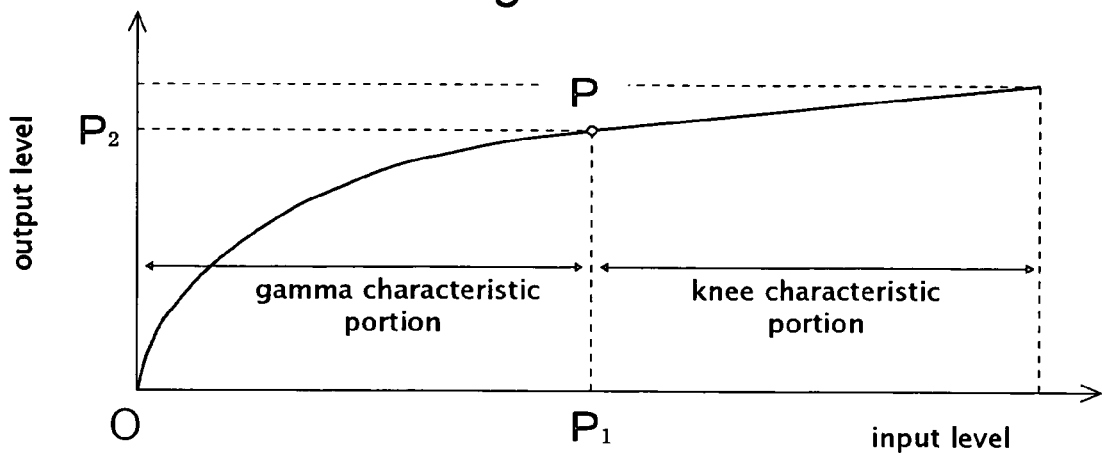
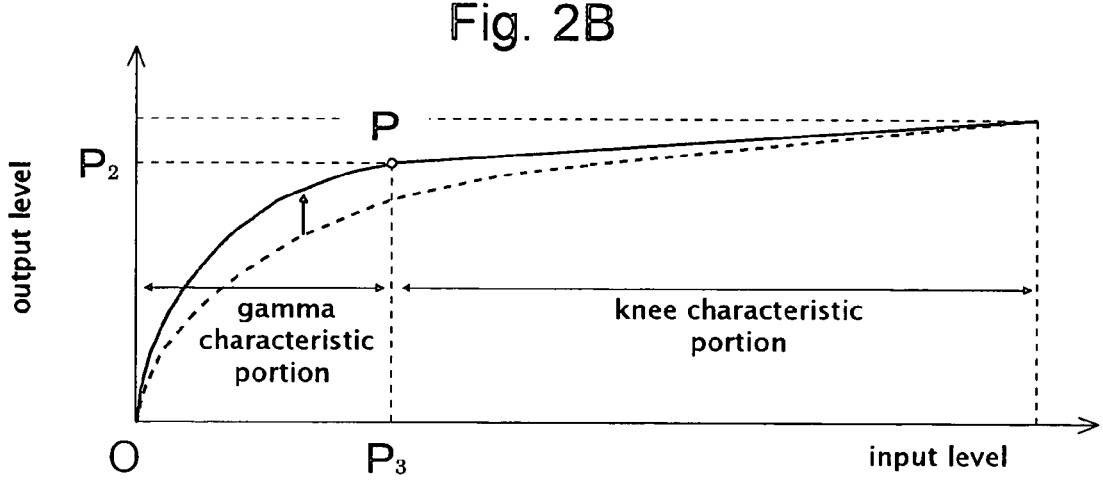

IMAGING APPARATUS

CROSS REFERENCE TO RELATED APPLICATION

This application is based upon and claims the benefit of priority from Japanese Patent Application No. 2005-101063, filed on Mar. 31, 2005, the entire contents of which are incorporated herein by reference.

BACKGROUND OF THE INVENTION

1. Field of the Invention

The present invention relates to an imaging apparatus such as a digital camera.

2. Description of the Related Art

An imaging apparatus controls exposure in accordance with the brightness of a subject before shooting the subject. That is, the imaging apparatus controls the aperture radius of the shooting lens, the shutter speed, and the ISO speed of the imaging device in accordance with the brightness of the subject so as to provide a correct level of brightness to the final image data obtained by shooting the subject (the output from the imaging apparatus) (e.g., see Japanese Unexamined Patent Application Publication No. 2003-241248).

However, even with the above-described such exposure control, the final image data (the output from the imaging apparatus) may often be unexpectedly too bright or too dark, and is not always of a good finished quality.

SUMMARY OF THE INVENTION

It is therefore an object of the present invention to provide an imaging apparatus that can provide final image data with a good quality irrespective of overexposure or underexposure.

An imaging apparatus according to the present invention includes an imaging unit capturing a subject image to produce image data; a conversion unit performing a gradation conversion on the image data; and a modification unit determining a level of brightness of the image data before the gradation conversion, and modifying input/output characteristics of the conversion unit used for the gradation conversion on the image data when the image data has a brightness level lower than a reference level of brightness. The input/output characteristics include a gamma characteristic portion and a knee characteristic portion. The modification unit modifies the input/output characteristics used for the gradation conversion on the image data in such a manner that the input/output characteristics used for the gradation conversion on image data with the reference level of brightness are increased in output level, and the increase occurs within a range of part of input level. The range corresponds at least to the gamma characteristic portion.

Another imaging apparatus according to the present invention includes an imaging unit capturing a subject image to produce image data; a conversion unit performing a gradation conversion on the image data; and a modification unit determining a level of brightness of the image data before the gradation conversion, and modifying input/output characteristics of the conversion unit used for the gradation conversion on the image data when a brightness level of the image data is higher than a reference level of brightness. The input/output characteristics include a gamma characteristic portion and a knee characteristic portion. The modification unit modifies the input/output characteristics used for the gradation conversion on the image data in such a manner that the input/output characteristics used for the gradation conversion on the image data with the reference level of brightness are decreased in output level, and the decrease occurs within a range of part of input level. The range of part corresponds at least to the gamma characteristic portion.

Furthermore, in the aforementioned imaging apparatus, preferably, the modification unit determines the level of brightness using as the reference level a predefined brightness level of the image data at a correct exposure, and modifies the input/output characteristics of the image data in such a manner that image data is outputted at correct exposure from the conversion unit.

Furthermore, preferably, the aforementioned imaging apparatus includes a recording unit recording an evaluation value during moving image shooting or continuous shooting. The evaluation value is for determining the level of brightness of the image data by the modification unit. The modification unit preferably modifies the input/output characteristics of the image data, with the evaluation value recorded in the recording unit during moving image shooting or continuous shooting taken into account.

Furthermore, preferably, the aforementioned imaging apparatus includes a control unit performing exposure control to the imaging unit, with the evaluation value recorded in the recording unit during moving image shooting or continuous shooting taken into account.

Another imaging apparatus according to the present invention includes an imaging unit capturing a subject image to produce image data; a photometry unit provided separately from the imaging unit and performing a photometric measurement of the subject image before the imaging unit captures the subject image; a control unit estimating a level of brightness of the image data from an output from the photometry unit, and performing exposure control to the imaging unit such that a brightness level of the image data is to be lower than a reference level of brightness; a conversion unit performing a gradation conversion on the image data; and a modification unit modifying input/output characteristics of the conversion unit before the gradation conversion is performed on the image data with a brightness level lower than the reference level of brightness. The input/output characteristics include a gamma characteristic portion and a knee characteristic portion. The modification unit modifies the input/output characteristics used for the gradation conversion on the image data with a brightness level lower than the reference level of brightness, in such a manner that the input/output characteristics used for the gradation conversion on the image data with the reference level of brightness are increased in output level, and the increase occurs within a range of part of input level. The range corresponds at least to the gamma characteristic portion.

Furthermore, preferably, the aforementioned imaging apparatus includes an estimation unit estimating an amount of saturation of the image data from the output of the photometry unit. Preferably, the control unit performs exposure control to the imaging unit in accordance with the amount of saturation and the modification unit modifies the input/output characteristics in accordance with the amount of saturation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 is a block diagram schematically showing the configuration of an imaging apparatus 10 according to a first embodiment;

FIG. 2A is an explanatory view showing an example of a gradation conversion curve;

FIG. 2B is an explanatory view showing an example of a gradation conversion curve;

DESCRIPTION OF THE PREFERRED EMBODIMENT

Figure 3:
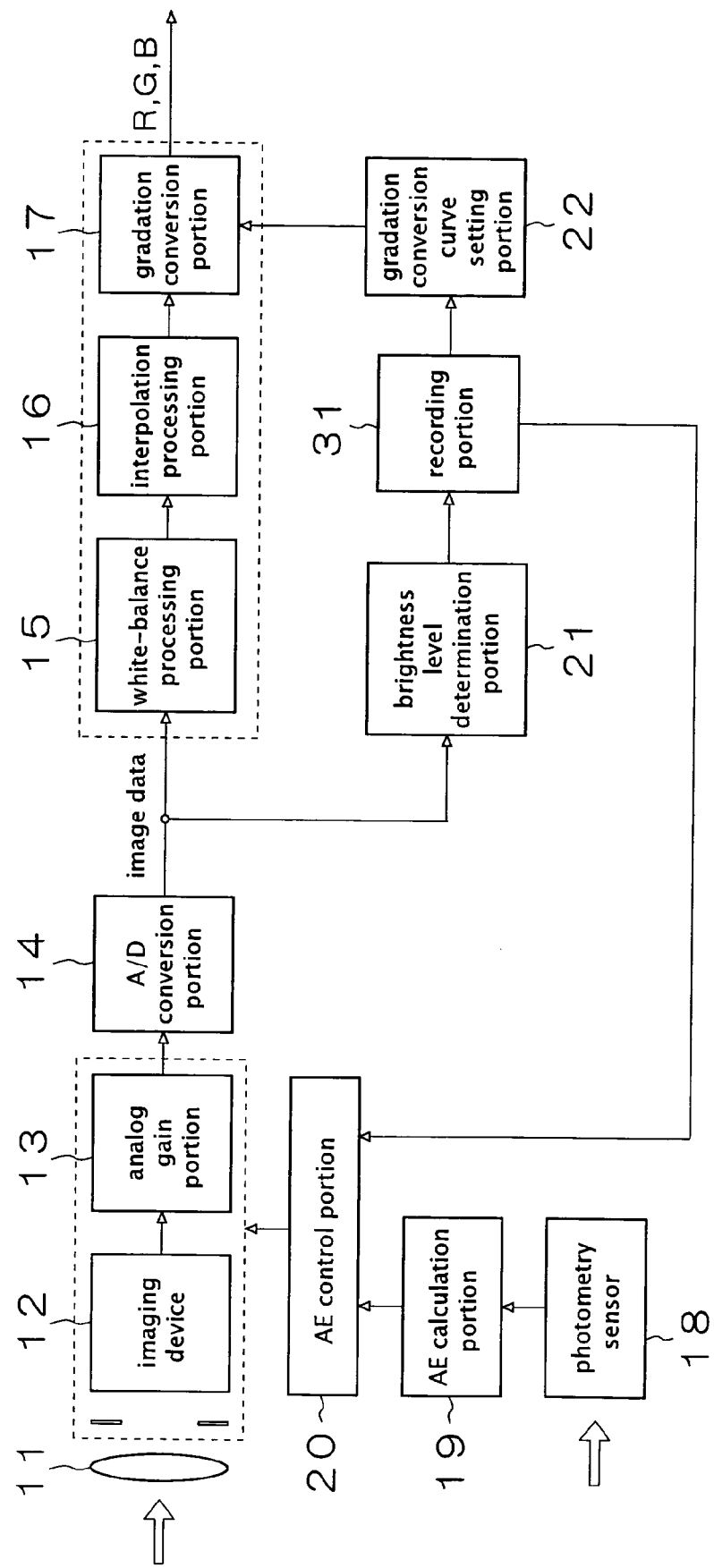
FIG. 3 is a block diagram schematically showing the configuration of an imaging apparatus 30 according to a second embodiment.

Now, the present invention will be described below in more detail with reference to the accompanying drawings in accordance with the embodiments.

First Embodiment

As shown in FIG. 1, an imaging apparatus 10 according to this embodiment is provided with a shooting lens 11, an imaging device 12, an analog gain portion 13, an A/D conversion portion 14, a white-balance processing portion 15, an interpolation processing portion 16, a gradation conversion portion 17, a photometry sensor 18, an AE calculation portion 19, an AE control portion 20, a brightness level determination portion 21, and a gradation conversion curve setting portion 22. For example, the imaging device 12 is a CCD sensor or a CMOS sensor. The imaging apparatus 10 is a digital single-lens reflex camera or a digital compact camera.

A beam of light from a subject is incident upon the imaging device 12 through the shooting lens 11. The imaging device 12 forms a subject image on its imaging surface. The imaging device 12 captures the subject image to output an analog imaging signal. The analog imaging signal is amplified at the analog gain portion 13, and then converted into a digital signal (hereinafter referred to as "image data") at the A/D conversion portion 14. The imaging device 12, the analog gain portion 13, and the A/D conversion portion 14 serve, as a whole, as a unit which captures a subject image to produce image data.

Furthermore, the image data from the A/D conversion portion 14 is subjected to white-balance processing at the white-balance processing portion 15, and then interpolated at the interpolation processing portion 16. Then, the gradation conversion portion 17 performs a gradation conversion on the image data. The final image data obtained through each of these processing steps may be then compressed and delivered to a recording portion (not shown) or the like.

On the other hand, before the imaging device 12 captures the subject image, the photometry sensor 18 provided separately from the imaging device 12 performs a photometric measurement on the subject image and then outputs a detected signal to the AE calculation portion 19. Based on the output from the photometry sensor 18, the AE calculation portion 19 estimates the level of brightness of the image data delivered from the A/D conversion portion 14, and then calculates a setting value for providing exposure control to the imaging unit (12 to 14) so that the image data is to have correct exposure.

In accordance with the setting value calculated by the AE calculation portion 19, the AE control portion 20 provides exposure control to the imaging device 12 capturing the subject image, thereby controlling at least one parameter of the aperture radius of the shooting lens 11, the shutter speed, and the ISO speed of the imaging device 12. Then, after the exposure control, the imaging device 12 captures the subject image in accordance with the setting values of the aperture radius and the shutter speed, and then the analog gain portion 13 performs a signal amplification in accordance with the setting value of the ISO speed. Thereafter, final image data is obtained through the processings of the subsequent portions (14 to 17).

Performing exposure control to the imaging unit (12 to 14) before shooting the subject makes it possible to obtain the final image data with a good quality at correct exposure basically. However, even with such exposure control, the final image data may unexpectedly have a higher or lower level of brightness, thus it is not always of a good finished quality.

In this context, in the imaging apparatus 10 according to this embodiment the brightness level determination portion 21 captures the image data delivered from the A/D conversion portion 14, and the gradation conversion curve setting portion 22 captures the result of a determination made therein, to modify, when required, the gradation conversion curve (the input/output characteristics of the gradation conversion portion 17). Then, the gradation conversion portion 17 performs a gradation conversion on a subject image data to correct the level of brightness thereof received by the brightness level determination portion 21.

More specifically, the brightness level determination portion 21 captures the image data from the A/D conversion portion 14, and then divides at least part of a screenful of the image data into a number of smaller areas to calculate the brightness level of each of the smaller areas. Furthermore, the brightness level determination portion 21 calculates the average brightness (or total brightness) from each of the brightness levels and employs the resulting value as the evaluation value for the level of brightness of the image data on which the gradation conversion has not yet been performed. Then, the brightness level determination portion 21 determines the level of brightness of the image data using as a reference the predefined brightness level of the image data at correct exposure. For example, the evaluation value for the level of brightness of the image data and the predefined reference level of brightness are compared with each other, and the deviation therebetween is converted into an EV (exposure value), so as to determine the level of brightness of the image data according to the EV.

Then, when the result of the aforementioned determination provided by the brightness level determination portion 21 shows that the subject image data has a brightness level equal to the reference level of brightness (EV=0), the gradation conversion curve setting portion 22 provides, as a setting, the typical gradation conversion curve shown in FIG. 2A to the gradation conversion portion 17. In this case, the subject image data (at the reference level of brightness) is subjected to a gradation conversion in accordance with the typical gradation conversion curve shown in FIG. 2A, thereby making it possible to obtain the final image data at correct exposure.

Here, the horizontal axis of FIG. 2A represents the input level while the vertical axis represents the output level. As shown in FIG. 2A, the gradation conversion curve includes a gamma characteristic portion and a knee characteristic portion. The gamma characteristic portion is a portion of the input/output characteristics along a gamma curve on the lower level side. The knee characteristic portion is a portion of the input/output characteristics along a generally linear curve on the higher level side. In the presence of the knee characteristic portion, it is possible to avoid a whiteout in the image data caused by the gradation conversion. In the typical gradation conversion curve shown in FIG. 2A, the input level ranges assigned to the gamma characteristic portion and the knee characteristic portion are generally equal to each other.

On the other hand, when the result of the aforementioned determination provided by the brightness level determination portion 21 shows that the subject image data has a brightness level lower than the reference level of brightness (EV>0), the gradation conversion curve setting portion 22 modifies the gradation conversion curve used for the gradation conversion of the subject image data. That is, the gradation conversion curve setting portion 22 modifies the gradation conversion curve such that the output level is increased within a range of part of the input level corresponding at least to the gamma characteristic portion in comparison with the gradation conversion curve of FIG. 2A, and then provides, as a setting, the gradation conversion curve shown in FIG. 2B to the gradation conversion portion 17.

For example, when the subject image data has a brightness level lower than the reference level of brightness by "1/3EV", the gradation conversion curve setting portion 22 modifies the gradation conversion curve in accordance with the deviation (1/3EV) such that the image data is delivered from the gradation conversion portion 17 at correct exposure (i.e., such that the level of brightness of the image data is increased by "1/3EV").

As can be seen from a comparison between FIGS. 2A and 2B, the gradation conversion curve of FIG. 2B has a reduced input level range assigned to the gamma characteristic portion and an accordingly increased range assigned to the knee characteristic portion with respect to the gradation conversion curve of FIG. 2A. That is, the comparison shows that the intersection P between the gamma characteristic portion and the knee characteristic portion is located at a lower input level in the gradation conversion curve of FIG. 2B. However, the output levels at the intersections P are the same.

To modify the gradation conversion curve, for example, the intersection P may be shifted towards the lower input level in accordance with the deviation (1/3EV) determined by the brightness level determination portion 21, while allowing the output level of the intersection P between the gamma characteristic portion and the knee characteristic portion to be maintained constant. As a result, it is possible to obtain the gradation conversion curve of FIG. 2B whose output level is increased with respect to the gradation conversion curve of FIG. 2A. Such a modification may be made by calculation or alternatively by selecting any one of a plurality of gradation conversion curves pre-stored in a memory device.

In the example of FIG. 2B, when the subject image data has a brightness level lower than the reference level of brightness, the gradation conversion curve is modified so as to increase the output level within the entire range of the input level (excluding the minimum level and the maximum level). Furthermore, a maximum increase in the output level occurs near the center of the gamma characteristic portion. At this time, a wider range of the input level is assigned to the knee characteristic portion rather than to the gamma characteristic portion.

When the gradation conversion curve shown in FIG. 2B is provided as a setting to the gradation conversion portion 17, the subject image data (having a brightness level lower the reference level of brightness) is subjected to a gradation conversion in accordance with the gradation conversion curve shown in FIG. 2B to increase the halftone output level from a dark portion, thereby finally making it possible to obtain the image data at correct exposure. Accordingly, it is possible to provide the final image data with a good finished quality irrespective of overexposure or underexposure.

Conversely, when the result of the aforementioned determination provided by the brightness level determination portion 21 shows that the subject image data has a brightness level higher than the reference level of brightness (EV<0), the gradation conversion curve setting portion 22 modifies, in the following manner, the gradation conversion curve used for the gradation conversion of the subject image data. That is, the gradation conversion curve setting portion 22 modifies the gradation conversion curve such that the output level is reduced within a range of part of the input level corresponding at least to the gamma characteristic portion in comparison with gradation conversion curve of FIG. 2A.

For example, when the subject image data has a brightness level higher than the reference level of brightness by "1/3EV", the gradation conversion curve setting portion 22 modifies the gradation conversion curve in accordance with the deviation (1/3EV) such that the image data is delivered from the gradation conversion portion 17 at correct exposure (i.e., such that the level of brightness of the image data is decreased by "1/3EV").

The gradation conversion curve modified, which is not shown, has an increased input level range assigned to the gamma characteristic portion and an accordingly reduced range assigned to the knee characteristic portion with respect to the gradation conversion curve of FIG. 2A. That is, the intersection P has been shifted towards the higher input level in accordance with the deviation (1/3EV) determined by the brightness level determination portion 21, while allowing the output level of the intersection P between the gamma characteristic portion and the knee characteristic portion to be maintained constant.

In this case, it is possible to obtain the gradation conversion curve whose output level is decreased with respect to the gradation conversion curve of FIG. 2A (here, the output level has been decreased within the entire range of the input level excluding the minimum level and the maximum level). A maximum decrease in the output level occurs near the center of the gamma characteristic portion. At this time, a wider range of the input level is assigned to the gamma characteristic portion rather than to the knee characteristic portion.

When such a gradation conversion curve is provided as a setting to the gradation conversion portion 17, the subject image data (having a brightness level higher than the reference level of brightness) is subjected to a gradation conversion in accordance with the gradation conversion curve lower in output level than that of FIG. 2A to decrease the halftone output level from a dark portion, thereby making it possible to obtain the final image data at correct exposure. Accordingly, it is possible to provide the final image data with a good finished quality irrespective of overexposure or underexposure.

As described above, the imaging apparatus 10 according to this embodiment increases a lower level portion of the gradation conversion curve when the image data delivered from the A/D conversion portion 14 has a brightness level lower than the reference level, or decreases the lower level portion of the gradation conversion curve when the image data has a brightness level higher than the reference level. Accordingly, this makes it possible to provide the final image data with a good finished quality irrespective of whether exposure control provides overexposure or underexposure. Such a correction of the level of brightness made by the gradation conversion portion 17 is effective for still image shooting. On the other hand, it is also possible to automatically perform development using, as the reference for determining the level of brightness, the brightness of the image data at correct exposure in such a manner that the final image data is provided at correct exposure (automatic digital exposure correction).

Furthermore, when determining the level of brightness of the image data captured from the A/D conversion portion 14, the imaging apparatus 10 according to this embodiment divides a screenful of the image data into smaller areas and then calculates the brightness level of each of the smaller areas. This makes it possible to determine the level of brightness in a relatively short period of time even for the imaging device 12 having a large number of pixels.

In the aforementioned embodiment, the photometry sensor 18 is provided separately from the imaging device 12. However, if the imaging apparatus 10 is a digital compact camera, the photometry sensor 18 can be eliminated. In this case, before shooting, a subject image can be photometrically measured using a through picture delivered periodically (e.g., at intervals of 1/30 sec) from the imaging device 12 to output a detected signal to the AE calculation portion 19, thereby making it possible to perform the same processing as in the foregoing.

Second Embodiment

Here, a description is given to such an example where a series of multiple pieces of image data are created in sequence as done during moving image shooting or during high-speed continuous shooting.

As shown in FIG. 3, an imaging apparatus 30 according to this embodiment is configured to include a recording portion 31 between the brightness level determination portion 21 and the gradation conversion curve setting portion 22 in the imaging apparatus 10 of FIG. 1, and the contents of the recording portion 31 can be referenced by the AE control portion 20.

In this case, the brightness level determination portion 21 outputs to the recording portion 31 the evaluation value obtained upon determining the level of brightness of the image data captured from the A/D conversion portion 14. Then, the recording portion 31 continues to record the evaluation values of a series of multiple pieces of image data during moving image shooting or during continuous shooting. The evaluation values accumulated in the recording portion 31 can be referenced by the gradation conversion curve setting portion 22 and the AE control portion 20.

During moving image shooting or continuous shooting, the gradation conversion curve setting portion 22 takes into account the current evaluation values recorded in the recording portion 31 in addition to the previous evaluation values, to modify the gradation conversion curve used for the gradation conversion of the subject image data. The previous evaluation value is thus taken into account when modifying the gradation conversion curve, thereby making it possible to provide a series of pieces of final image data with a good finished quality while preventing variations in brightness thereof. Thus, this enables stable moving image shooting or continuous shooting.

On the other hand, during moving image shooting or during continuous shooting, the AE control portion 20 takes into account the evaluation values recorded in the recording portion 31 to provide exposure control to the imaging unit (12 to 14). Typically, the exposure control is made in accordance with the setting value provided by the AE calculation portion 19. However, when it is determined from the evaluation values recorded in the recording portion 31 that "the image data continually has a brightness level lower (or higher) than the reference level", the AE control portion 20 provides exposure control by taking into account the continual evaluation values on the way of moving image shooting or continuous shooting.

More specifically, at least one parameter of the current aperture radius of the shooting lens 11, the shutter speed, and the ISO speed of the imaging device 12 is varied in accordance with the deviation (EV) of the aforementioned continual evaluation value from the reference level of brightness, thereby providing exposure control on the way.

For example, when the deviation of the aforementioned continual evaluation value from the reference level of brightness indicates that the image data has a brightness level lower by "1/3EV", the aperture radius may be increased by the amount of 1/3EV, the shutter speed may be reduced by the amount of 1/3EV, or the ISO speed may be increased by the amount of 1/3EV. Alternatively, the required level of exposure control may be distributed so as to vary all of the aperture radius, the shutter speed, and the ISO speed each by an amount of 1/9EV.

After exposure control has been made during moving image shooting or continuous shooting, the image data delivered from the A/D conversion portion 14 has the reference level of brightness. Thus, the gradation conversion curve setting portion 22 provides, as a setting, the typical gradation conversion curve shown in FIG. 2A to the gradation conversion portion 17.

As describe above, the evaluation values recorded in the recording portion 31 can be taken into account to provide exposure control to the imaging unit (12 to 14), thereby alleviating the load of the gradation conversion curve setting portion 22 during moving image shooting and during continuous shooting.

Third Embodiment

Figure 4:
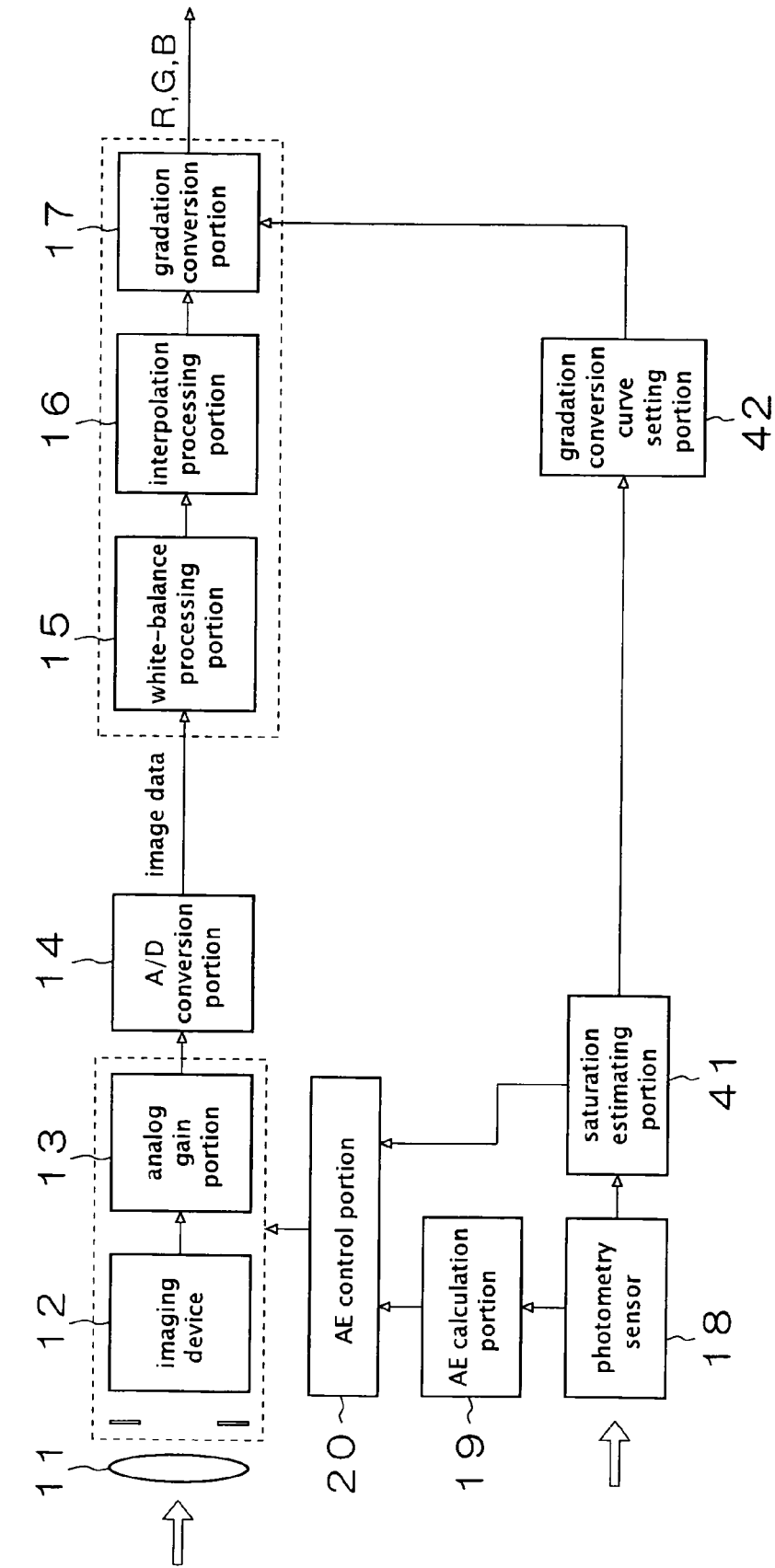
FIG. 4 is a block diagram schematically showing the configuration of an imaging apparatus 40 according to a third embodiment.

As shown in FIG. 4, an imaging apparatus 40 according to this embodiment is configured such that the brightness level determination portion 21 and the gradation conversion curve setting portion 22 in the imaging apparatus 10 of FIG. 1 are eliminated, and a saturation estimating portion 41 and a gradation conversion curve setting portion 42 are located downstream of the photometry sensor 18.

In the imaging apparatus 40, the photometry sensor 18 provided separately from the imaging device 12 provides a photometric measurement to a subject image to output a detected signal to the AE calculation portion 19. The AE calculation portion 19 estimates the level of brightness of the image data delivered from the A/D conversion portion 14 based on the output from the photometry sensor 18, and calculates a setting value for performing exposure control to the imaging unit (12 to 14) in such a manner that the image data is provided at correct exposure.

On the other hand, the imaging apparatus 40 is provided with the saturation estimating portion 41, and estimates the amount of saturation of the image data delivered from the A/D conversion portion 14 based on the output from the photometry sensor 18. The saturation estimating portion 41 checks the brightness level of each pixel in the output from the photometry sensor 18 to count and employ, as the amount of saturation, the number of pixels having a level equal to or higher than the predefined saturation level.

Then, in accordance with the setting value determined by the AE calculation portion 17 and the amount of saturation estimated by the saturation estimating portion 41, the AE control portion 20 provides exposure control to the imaging unit (12 to 14), thereby controlling at least one parameter of the aperture radius of the shooting lens 11, the shutter speed, and the ISO speed of the imaging device 12.

For example, suppose that the amount of saturation estimated by the saturation estimating portion 41 corresponds to "1/3EV". In this case, with respect to the setting values (the aperture radius, the shutter speed, and the ISO speed) determined by the AE calculation portion 17, the AE control portion 20 varies any one of these parameters in accordance with the amount of saturation (1/3EV). That is, this may be conceivably realized by reducing the aperture radius by 1/3EV, increasing the shutter speed by 1/3EV, reducing the ISO speed by 1/3EV, or varying all of the aperture radius, the shutter speed, and the ISO speed each by 1/9EV.

As described above, based on the output from the photometry sensor 18, the imaging apparatus 40 according to this embodiment estimates the level of brightness of the image data delivered from the A/D conversion portion 14 as well as the amount of saturation of the image data. When the image data has an amount of saturation that is not negligible (e.g., 1/3EV), the imaging apparatus 40 provides exposure control to the imaging unit (12 to 14) such that the image data has a brightness level lower than the reference level of brightness by the amount of saturation.

Furthermore, the amount of saturation estimated by the saturation estimating portion 41 is also delivered to the gradation conversion curve setting portion 42 to modify the gradation conversion curve before a gradation conversion is performed on the image data having a brightness level lower than the reference level of brightness obtained from the A/D conversion portion 14 by the aforementioned exposure control. The gradation conversion curve setting portion 42 modifies the gradation conversion curve such that the output level is increased within a range of part of the input level corresponding at least to the gamma characteristic portion in comparison with the typical gradation conversion curve shown in FIG. 2A, and then provides, as a setting, for example, the gradation conversion curve shown in FIG. 2B to the gradation conversion portion 17.

For example, suppose that the aforementioned exposure control has caused the image data to have a brightness level lower than the reference level of brightness by "1/3EV". In this case, in accordance with the amount of saturation (1/3EV) estimated by the saturation estimating portion 41, the gradation conversion curve setting portion 42 modifies the gradation conversion curve such that the image data delivered from the gradation conversion portion 17 is provided at correct exposure (i.e., such that the level of brightness of the image data is increased by "1/3EV").

Accordingly, the image data made lower in brightness level than the reference level of brightness by "1/3EV" is subjected to a gradation conversion in accordance with the gradation conversion curve (FIG. 2B) provided with the modified settings to increase the halftone output level from a dark portion, thereby finally making it possible to obtain the image data at correct exposure. Accordingly, this makes it possible to provide the final image data with a good finished quality irrespective of whether the exposure control provides overexposure or underexposure. It is also possible to prevent a whiteout without changing the exposure of the entire image which has been processed, thereby providing an extended dynamic range.

Furthermore, since the aforementioned exposure control and modification to the gradation conversion curve are employed only when required in accordance with the amount of saturation of the image data, it is possible to extend the dynamic range in a scene-adaptive manner. In this regard, suppose that the image data has only an amount of saturation that is negligible. In this case, the AE control portion 20 provides exposure control only in accordance with the setting value provided by the AE calculation portion 19, while the gradation conversion curve setting portion 42 provides as a setting the typical gradation conversion curve shown in FIG. 2A to the gradation conversion portion 17.

Furthermore, the imaging apparatus 40 according to this embodiment estimates the level of brightness and the amount of saturation of the image data based on the output from the photometry sensor 18 provided separately from the imaging device 12. Accordingly, this makes it possible to provide the final image data with a good finished quality in shooting a still image using a digital single-lens reflex camera. Furthermore, not only the digital single-lens reflex camera but also a digital compact camera can provide the same effect by the photometry sensor 18 being provided separately from the imaging device 12.

The aforementioned embodiments has described such a case in which the image data is pre-set to a lower exposure when required (when the image data has an amount of saturation that is not negligible) to increase a low level portion of the gradation conversion curve. However, a converse example may also be possible. That is, the present invention is also applicable to the case where the image data is pre-set to a higher exposure so as to decrease the low level portion of the gradation conversion curve.

The invention is not limited to the above embodiments and various modifications may be made without departing from the spirit and scope of the invention. Any improvement may be made in part or all of the components.

What is claimed is:

1. An imaging apparatus comprising:
an imaging unit capturing a subject image to produce image data;
a conversion unit performing a gradation conversion on the image data; and
a modification unit determining a level of brightness of the image data before the gradation conversion, and modifying input/output characteristics of said conversion unit used for the gradation conversion on the image data when a brightness level of the image data is lower than a reference level of brightness, wherein:
the input/output characteristics include a gamma characteristic portion and a knee characteristic portion; and
said modification unit modifies the input/output characteristics used for the gradation conversion on the image data in such a manner that output level is increased within a range of part of input level in comparison with the input/output characteristics used for the gradation conversion on image data with the reference level of brightness, the input level corresponding at least to said gamma characteristic portion.

2. The imaging apparatus according to claim 1, wherein said modification unit determines the level of brightness using as the reference level a predefined brightness level of the image data at correct exposure, and modifies the input/output characteristics of the image data in such a manner that image data is outputted at correct exposure from said conversion unit.

3. The imaging apparatus according to claim 2, further comprising
a recording unit recording an evaluation value during moving image shooting or continuous shooting, the evaluation value being for determining a level of brightness of the image data by said modification unit, wherein
said modification unit modifies the input/output characteristics of the image data, with the evaluation value recorded in said recording unit during moving image shooting or continuous shooting taken into account.

4. The imaging apparatus according to claim 3, further comprising
a control unit performing exposure control to said imaging unit, with the evaluation value recorded in said recording unit during moving image shooting or continuous shooting taken into account.

5. The imaging apparatus according to claim 1, further comprising
a recording unit recording an evaluation value during moving image shooting or continuous shooting, the evaluation value being for determining a level of brightness of the image data by said modification unit, wherein
said modification unit modifies the input/output characteristics of the image data, with the evaluation value recorded in said recording unit during moving image shooting or continuous shooting taken into account.

6. The imaging apparatus according to claim 5, further comprising
a control unit performing exposure control to said imaging unit, with the evaluation value recorded in said recording unit during moving image shooting or continuous shooting taken into account.

7. An imaging apparatus comprising:
an imaging unit capturing a subject image to produce image data;
a conversion unit performing a gradation conversion on the image data; and
a modification unit determining a level of brightness of the image data before the gradation conversion, and modifying input/output characteristics of said conversion unit used for the gradation conversion on the image data when a brightness level of the image data is higher than a reference level of brightness, wherein:
the input/output characteristics include a gamma characteristic portion and a knee characteristic portion; and
said modification unit modifies the input/output characteristics used for the gradation conversion on the image data in such a manner that output level is decreased within a range of part of input level in comparison with the input/output characteristics used for the gradation conversion on image data with the reference level of brightness, the input level corresponding at least to said gamma characteristic portion.

8. The imaging apparatus according to claim 7, wherein
said modification unit determines the level of brightness using as the reference level a predefined brightness level of the image data at correct exposure, and modifies the input/output characteristics of the image data in such a manner that image data is outputted at correct exposure from said conversion unit.

9. The imaging apparatus according to claim 7, further comprising
a recording unit recording an evaluation value during moving image shooting or continuous shooting, the evaluation value being for determining a level of brightness of the image data by said modification unit, wherein
said modification unit modifies the input/output characteristics of the image data, with the evaluation value recorded in said recording unit during moving image shooting or continuous shooting taken into account.

10. The imaging apparatus according to claim 6, further comprising
a control unit performing exposure control to said imaging unit, with the evaluation value recorded in said recording unit during moving image shooting or continuous shooting taken into account.

11. An imaging apparatus comprising:
an imaging unit capturing a subject image to produce image data;
a photometry unit provided separately from said imaging unit and performing a photometric measurement of the subject image before said imaging unit captures the subject image;
a control unit estimating a level of brightness of the image data from an output of said photometry unit, and performing exposure control to said imaging unit such that a brightness level of the image data is to be lower than a reference level of brightness;
a conversion unit performing a gradation conversion on the image data; and
a modification unit modifying input/output characteristics of said conversion unit before the gradation conversion is performed on the image data with a brightness level lower than the reference level of brightness, wherein:
the input/output characteristics include a gamma characteristic portion and a knee characteristic portion; and
said modification unit modifies the input/output characteristics used for the gradation conversion on the image data with a brightness level lower than the reference level of brightness, in such a manner that output level is increased within a range of part of input level in comparison with the input/output characteristics used for the gradation conversion on the image data with the reference level of brightness, the input level corresponding at least to said gamma characteristic portion.

12. The imaging apparatus according to claim 11, further comprising
an estimation unit estimating an amount of saturation of the image data from the output of said photometry unit, wherein:
said control unit performs exposure control to said imaging unit in accordance with the amount of saturation; and
said modification unit modifies the input/output characteristics in accordance with the amount of saturation.

* * * * *